Oct. 20, 1942.　　　C. P. SWEENY　　　2,299,190
MOTOR CONTROL
Filed July 11, 1939
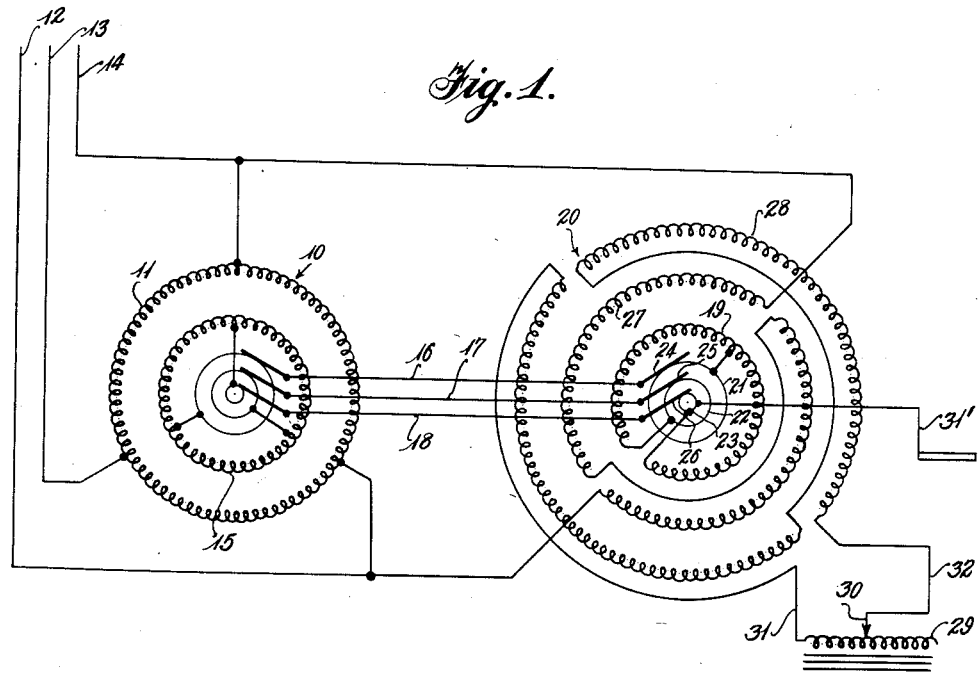
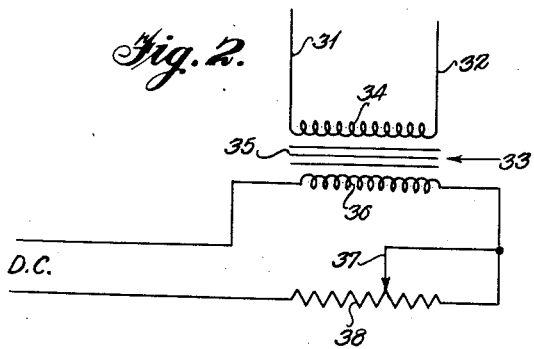
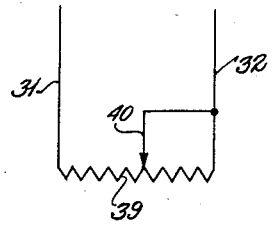
Inventor
Charles P. Sweeny
By Barnes, Kisselle, Laughlin & Raisch
Attorneys Patented Oct. 20, 1942

2,299,190

UNITED STATES PATENT OFFICE 2,299,190

MOTOR CONTROL

Charles P. Sweeny, Detroit, Mich., assignor to Vickers, Incorporated, Detroit, Mich., a corporation of Michigan Application July 11, 1939, Serial No. 283,899

8 Claims. (Cl. 171—119)

This invention relates to a motor control and more particularly to a system for controlling the speed of wound rotor induction motors.

An object of the invention is to provide an improved apparatus for controlling the speed of a wound rotor induction motor.

Another object of the invention is to provide a device having a minimum of moving parts for controlling and setting the speed of a wound rotor induction motor.

A further object of the invention is to provide a device connected electrically to the rotor windings of a wound rotor induction motor for controlling the impedance of the rotor winding to vary the speed of the motor.

Other objects and advantages of the invention will appear in the following description of preferred embodiments thereof shown in the attached drawing, of which:

Figure 1 is a schematic diagram of a system in accordance with the present invention;

Figure 2 is a similar view of a modified portion of the system; and

Figure 3 is a view similar to Figure 2 showing a still further modified portion of the system.

Referring to the drawing, 10 indicates a conventional wound rotor induction motor having a primary winding 11 connected to a three phase source of power by the conductors 12, 13 and 14. The motor 10 includes a low resistance phase wound secondary winding 15 connected through slip rings and brushes to external conductors 16, 17 and 18. The motor 10 may obviously have the secondary winding on the stator and the primary on the rotor but such construction also will be referred to as a wound rotor induction motor.

The secondary winding 15 of the motor 10 is connected through the conductors 16, 17 and 18 to a rotor winding 19 upon a speed control device 20. The rotor winding 19 is, preferably, a distributed winding connected to slip rings 21, 22 and 23. The mid point of the winding 19 is connected to one slip ring 21 and the terminals of the winding are connected to slip rings 22 and 23. The conductors 16, 17 and 18 are connected to brushes 24, 25 and 26, respectively.

The stator of the speed control device 20 is provided with two windings 27 and 28. One winding 27 comprises a single phase winding connected to the conductors 12 and 14 of the alternating current line, that is to say, the winding 27 is connected across one phase of the alternating current winding. The winding 28 is similar to the winding 27 but is positioned at right angles thereto and is connected across a reactor 29 having an adjustable tap 30 so that the inductance of the reactor 29 may be adjusted by conductors 31 and 32. The rotor of the speed control device 20 is arranged to be manually or otherwise rotated to an adjusted position, for example, by the crank 31'. It is apparent that the winding 19 could be on the stator and the windings 27 and 28 upon the rotor and that the slip rings 21, 22 and 23 and brushes 24, 25 and 26 can be replaced by flexible connectors as the winding 19 need be rotated but 90°.

During the operation of the motor 10, voltages will be induced in the winding 15 thereof due to slip between the rotating field set up by the winding 11 and the rotor winding 15. This produces a three phase alternating current voltage across the conductors 16, 17 and 18, which is applied to the winding 19 of the speed control device 20. The connection to the winding 19 is such that a single phase oscillating field is produced in the iron of the speed control device 20. It will be noted that the winding 19 is, in effect, a center tapped coil having its center terminal connected to one conductor of a three-wire, three-phase source and its end terminals connected to the other conductors of said source. The flux produced by currents flowing in such coil is the same as would be produced by connecting the three terminals of a center tapped coil positioned upon one leg of a transformer to the conductors of a three-wire, three-phase line. The resulting flux could only be a single phase flux produced by the resultant currents in the two halves of said coil. The single phase excitation of the winding 27 also sets up a single phase oscillating field in the iron of the device 20. The field produced by the winding 27 is of higher frequency than the field produced by the winding 19. The energization of the winding 27 is such that when the two fields referred to are in alignment the iron of the device 20 is saturated above the knee of the saturation curve at least for a portion of the cycle of the voltage impressed upon the winding 19 from the rotor of the induction motor 10. The winding 19 then has a low impedance for currents flowing through the winding 15 of the motor 10 and the winding 19 of the speed control device 20. The winding 19 of the speed control device 20 is a low resistance winding so that the impedance of the circuit including the winding 15 of the motor 10 is low and the motor 10 runs at a high speed.

When the rotor winding 19 of the speed control device 20 is rotated to a position at right angles from that just described, the field set up by the winding 19 is at right angles to the field set up by the winding 27 so that these fields thread different portions of the iron and have no substantial effect upon each other. The field set up by the winding 19, however, cuts the conductors of the winding 28 of the speed control device 20 to induce voltages therein causing currents to flow through the winding 28 and reactor 29. If the circuit including winding 28 is made of high impedance, this impedance is reflected into the circuit including the rotor winding 15 of the motor 10 by transformer action. The last-mentioned circuit becomes a high impedance circuit so that the motor 10 runs at low speed. The speed of the motor 10 will vary with the position of the rotor winding 19 of the device 20 with respect to the stator windings thereof so that any desired intermediate speed may be produced by rotating the winding 19 to a position intermediate that at which its field lines up with the field of the winding 27 and that at which the field of the winding 19 is at right angles to the field of the winding 27.

The impedance of the winding 28 and, therefore, the impedance of the circuit including the rotor winding 15 of the motor 10 when the winding 19 is set to induce voltages therein can be varied by varying the position of the adjustable tap 30 on the inductance 29. By adjusting the tap 30 so that the circuit including the winding 28 has high impedance, the speed of the motor can be brought to a relatively low value, whereas if the tap 30 is moved to short circuit the inductor 29, the speed of the motor at the low speed position of winding 19 will not be as low. The lowest speed of the motor under these conditions will depend upon the normal impedance of the winding 28. For example, if this winding normally has relatively high resistance, the motor 10 will operate at relatively low speed even if no inductance 29 is employed.

Also, it is not necessary that the winding 27 be energized with single phase alternating current. If this winding is of low resistance and inductance and is then short circuited, the circuit including the winding 10 of the motor will have low impedance when the winding 19 is so positioned that its field cuts the conductors of the winding 27 to induce voltages therein and cause currents to flow through the short circuit connection of the winding 27. Under these conditions the motor 11 will run at a relatively high speed. If the circuit including the winding 28 is made of high impedance, turning the rotor 90° from the position just mentioned will cause the motor to run at a relatively low speed. Intermediate positions will provide intermittent speeds.

The adjustable tap 30 of the reactor 29 can be employed to predetermine the speed range of the motor. The position of the tap has substantially no effect upon the highest speed of the motor but changing the position of the tap varies the lowest speed to which the motor can be brought by rotating the winding 19. For any position of the tap 30 the speed of the motor can be brought gradually from its highest speed to the low speed corresponding to a given setting of tap 30 by manually or otherwise rotating the winding 19 of the device 20 through 90°.

In Figure 2 is shown another type of variable reactor 33 which may be employed instead of the reactor 29 of Figure 1. The reactor 33 may be of any known type of saturable reactor and is shown as having a reactance winding 34 connected to the conductors 31 and 32 and positioned upon an iron core 35. The iron core 35 will ordinarily be of the three leg type having the winding 34 upon one leg and a direct current winding 36 upon the other legs. The construction and operation of such reactors are well known and need not be further described. Application of direct current energization to the winding 36 reduces the reactance of the winding 34 so that any desired predetermined low speed of the motor can be secured by varying the position of an adjustable contact 37 on a resistor 38 in series with the direct current winding 36.

The reactor 29 of Figure 1 may also be replaced by a resistor 39 shown in Figure 3. Any predetermined low speed of the motor 10 can be obtained by changing the position of the adjustable contact 40 on the resistor 39. The employment of the resistor 39 of Figure 3 for the reactor 29 of Figure 1, however, lessens the efficiency of the system due to the $I^2R$ loss therein.

While I have disclosed the preferred embodiments of my invention, it is understood that the details thereof may be varied within the scope of the following claims.

I claim:

1. A variable impedance device having first and second relatively rotatable iron members, a first winding upon said first member connected to an alternating current circuit so that currents due to voltages in said circuit produce an oscillating field in the iron of said device, a second winding upon said second member, a third winding upon said second member positioned at right angles electrically to said second winding, said third winding being included in a high impedance circuit whereby the impedance thereof is reflected into said alternating current circuit when said first member is in a position relative to said second member so that said oscillating field cuts the conductors of said third winding, said second winding being connected to a source of alternating current to produce a second oscillating field in the iron of said device which is at right angles electrically to the first mentioned oscillating field when said first member is in said position, said first member having a position relative to said second member so that said oscillating fields are in alignment, said oscillating fields being of sufficient intensity to saturate the iron of said device when in alignment so as to reduce the impedance of said alternating current circuit and means to rotate one of said members relative to the other member.

2. A variable impedance device having first and second relatively rotatable members, a first winding upon said first member and connected to an alternating current circuit so that currents due to voltages in said circuit produce an oscillating field in the members of said device, a second winding upon said second member, a third winding upon said second member electrically independent of said alternating current circuit and positioned at right angles electrically to said second winding, said third winding being included in a high impedance circuit whereby the impedance thereof is reflected into said alternating current circuit when said first member is in a position relative to said second member so that said oscillating field cuts the conductors of said third winding, means including said second winding for reducing the impedance reflected into said alternating current circuit when said first member is positioned relative to said second member so that said oscillating field cuts the conductors of said second winding, and means to rotate one of said members relative to the other member.

3. A variable impedance device having first and second relatively rotatable members, a first winding upon said first member and connected to an alternating current circuit so that currents due to voltages in said circuit produce an oscillating field in the members of said device, a second winding upon said second member, a third winding upon said second member electrically independent of said alternating current circuit and positioned at right angles electrically to said second winding, an external impedance in series with said third winding whereby the impedance thereof is reflected into said circuit when said first member is positioned relative to said second member so that said oscillating field cuts the conductors of said third winding, means including said second winding for reducing the impedance reflected into said circuit when said first member is positioned relative to said second member so that said oscillating field cuts the conductors of said second winding, and means to rotate one of said members relative to the other member.

4. A variable impedance device having first and second relatively rotatable members, a first winding upon said first member and connected to an alternating current circuit so that currents due to voltages in said circuit produce an oscillating field in the members of said device, a second winding upon said second member, a third winding upon said second member electrically independent of said alternating current circuit and positioned at right angles electrically to said second winding, an external impedance in series with said third winding whereby the impedance thereof is reflected into said circuit when said first member is positioned relative to said second member so that said oscillating field cuts the conductors of said third winding, means to vary the impedance of said external impedance to predetermine the highest impedance reflected into said circuit, means including said second winding for reducing the impedance reflected into said circuit when said first member is positioned relative to said second member so that said oscillating field cuts the conductors of said second winding, and means to rotate one of said members relative to the other member.

5. A variable impedance device having first and second relatively rotatable members, a first winding upon said first member and connected to an alternating current circuit so that currents due to voltages in said circuit produce an oscillating field in the members of said device, a second winding upon said second member, a third winding upon said second member electrically independent of said alternating current circuit and positioned at right angles electrically to said second winding, a reactor in series with said third winding, whereby the impedance thereof is reflected into said circuit when said first member is positioned relative to said second member so that said oscillating field cuts the conductors of said third winding, means including said second winding for reducing the impedance reflected into said circuit when said first member is positioned relative to said second member so that said oscillating field cuts the conductors of said second winding, and means to rotate one of said members relative to the other member.

6. A variable impedance device having first and second relatively rotatable members, a first winding upon said first member and connected to an alternating current circuit so that currents due to voltages in said circuit produce an oscillating field in the members of said device, a second winding upon said second member, a third winding upon said second member electrically independent of said alternating current circuit and positioned at right angles electrically to said second winding, a reactor in series with said third winding, whereby the impedance thereof is reflected into said circuit when said first member is positioned relative to said second member so that said oscillating field cuts the conductors of said third winding, means to vary the reactance of said reactor to predetermine the maximum impedance reflected into said circuit, means including said second winding for reducing the impedance reflected into said circuit when said first member is positioned relative to said second member so that said oscillating field cuts the conductors of said second winding and means to rotate one of said members relative to the other.

7. A variable impedance device having first and second relatively rotatable members, a first winding upon said first member and connected to an alternating current circuit so that currents due to voltages in said circuit produce an oscillating field in the members of said device, a second winding upon said second member, a third winding upon said second member electrically independent of said alternating current circuit and positioned at right angles electrically to said second winding, a resistor in series with said third winding whereby the impedance thereof is reflected into said circuit when said first member is positioned relative to said second member so that said oscillating field cuts the conductors of said third winding, means including said second winding for reducing the impedance reflected into said circuit when said first member is positioned relative to said second member so that said oscillating field cuts the conductors of said second winding, and means to rotate one of said members relative to the other.

8. A variable impedance device having first and second relatively rotatable iron members, a first winding upon said first member and connected to an alternating current circuit so that currents due to voltages in said circuit produce an oscillating field in the iron of said device, a second winding upon said second member, a third winding upon said second member positioned at right angles electrically to said second winding, an external impedance in series with said third winding whereby the impedance thereof is reflected into said circuit when said first member is in position relative to said second member so that said oscillating field cuts the conductors of said third winding, said second winding being connected to a source of alternating current to produce a second oscillating field in the iron of said device which is at right angles to the first mentioned oscillating field when said first member is in said position, said first member having a position relative to said second member so that said oscillating fields are in alignment, said oscillating fields being of sufficient intensity to saturate the iron of said device when in alignment so as to reduce the impedance reflected into said circuit and means to rotate one of said members relative to the other.

CHARLES P. SWEENY.